Dec. 17, 1957 C. E. HEMMINGER 2,816,857
FLUID HYDROFORMING PROCESS WITH REGENERATION
OF THE PLATINUM CONTAINING CATALYST
Filed May 1, 1951
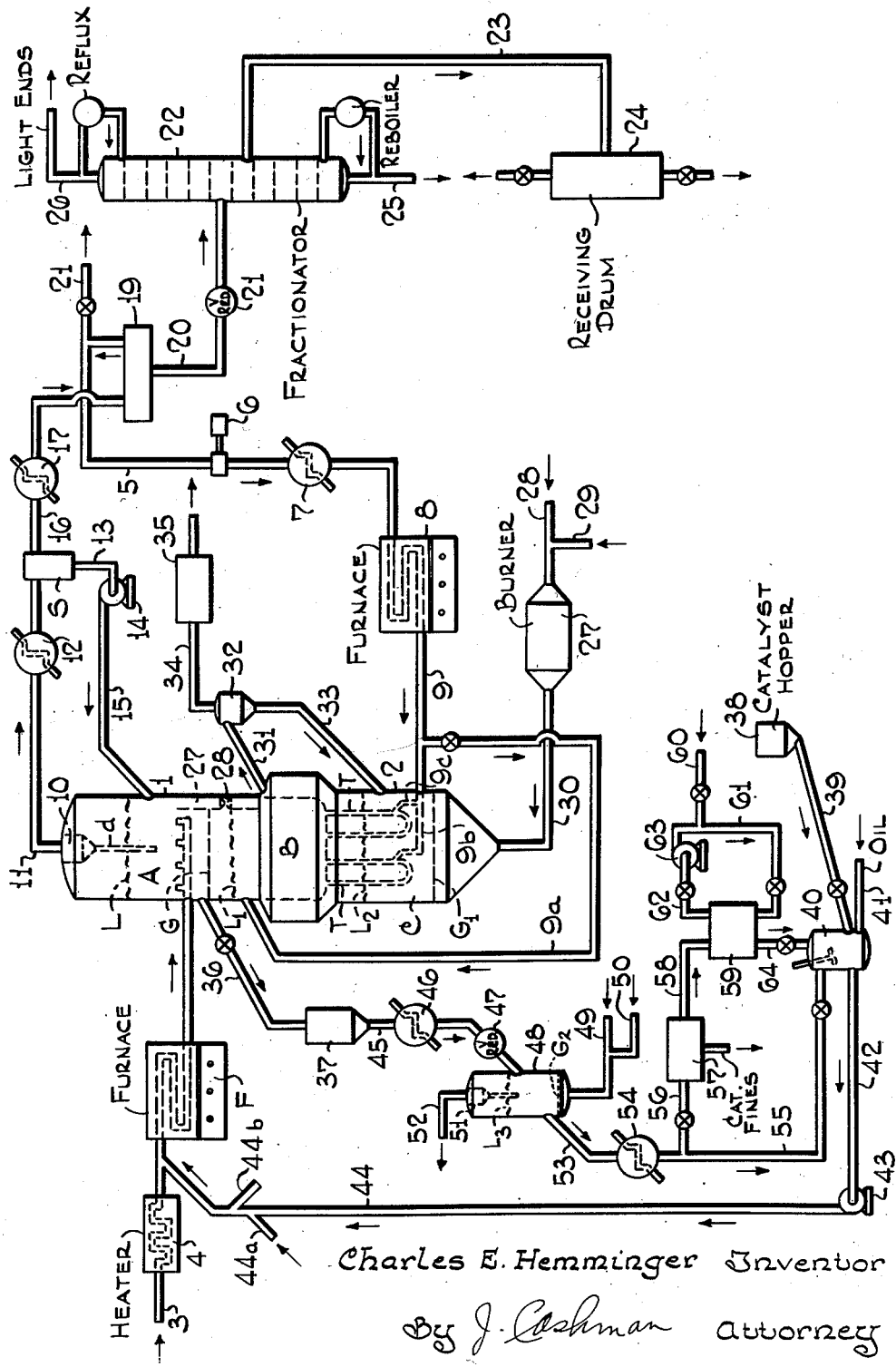
Charles E. Hemminger Inventor
By J. Cashman Attorney United States Patent Office 2,816,857
Patented Dec. 17, 1957

2,816,857

FLUID HYDROFORMING PROCESS WITH REGENERATION OF THE PLATINUM CONTAINING CATALYST

Charles E. Hemminger, Westfield, N. J., assignor to Esso Research and Engineering Company, a corporation of Delaware Application May 1, 1951, Serial No. 223,951

5 Claims. (Cl. 196—50)

The present invention relates to improvements in hydroforming. More particularly, it relates to a hydroforming process employing a catalyst of a platinum group metal in the form of a fluidized bed during the hydroforming operation and includes so operating as to maintain a process continuous by regenerating the catalyst with hydrogen to maintain it in an active state for an extended period of time, but also includes occasional or periodic regeneration of the catalyst with an oxygen-containing gas.

Heretofore and prior to this invention it was known that naphthas could be reformed by contacting them at elevated temperatures and pressures with a catalyst containing platinum. These prior operations were carried out at very high pressures and the catalyst was employed in the form of a fixed bed. Since the hydroforming of naphthas is a highly endothermic reaction, one of the great difficulties of the fixed bed type of operation was that of getting heat into the reactor. It is virtually impossible to maintain the fixed bed of catalyst at a uniform temperature due to the endothermic nature of the reaction and, therefore, it was quite common to employ two or more reactors in series with reheating between stages. The present invention, since it provides for the fluid catalyst technique, makes it possible to carry out the hydroforming operation under substantially isothermal conditions due to the very excellent mixing of all portions of the catalyst, which this technique affords.

Hydroforming is generally defined as an operation in which naphthenic hydrocarbon oil is contacted at elevated temperatures with a suitable solid catalyst, hydrogen also being added with the naphthenic feed oil. The process is generally conducted, however, so that there is no net consumption of hydrogen. The hydroforming operation, from a chemical standpoint, is essentially dehydrogenation of naphthenic hydrocarbons accompanied by some hydrocracking, more extensive isomerization and rather complete hydrogenation of olefins originally present or formed in situ.

The main object of the present invention is to operate a hydroforming process under substantially isothermal conditions in the reactor, and at the same time to regenerate the catalyst with hydrogen so as to enable the operation to continue on-stream for an extended period of time at a reasonable pressure level.

Another object of the present invention is to hydroform hydrocarbon oils to improve their aromaticity and, therefore, their octane rating in a manner which is more efficient and cheaper than processes heretofore known.

Another object of the present invention is to provide auxiliary means to insure continuous operation of the hydroforming process for an extended period of time.

Another feature of the invention is to provide improved means for supplying heat to the hydroforming reaction.

Another feature of the invention is to maintain the catalyst used at a high activity level.

Another important object of the process is to obtain higher yields of product at a given octane rating than heretofore attainable.

Other and further objects of the present invention will be apparent from the following more detailed description and claims.

In the accompanying drawing, there is shown schematically, an apparatus layout adapted for carrying out the present invention.

Referring in detail to the drawing, 1 represents a vessel containing two fluidized beds of catalyst, namely, bed A, which is a fluidized bed of powdered platinum catalyst having a particle size of from, say, 200–400 mesh or finer; and bed B is a fluidized bed of the same catalyst which is to be treated with a hydrogen-containing gas to remove the contaminants formed on the catalyst during its use in bed A, so as to reactivate the catalyst and, therefore, restore its activity. In second vessel 2, which is in communication with the lower portion of vessel 1, there is disposed a fluidized bed of heat retention material C, such as sand, rock, granite, refractory material, or other inert material ground to a fluidizable size. As will subsequently appear, this finely ground inert material, which is also in the form of a fluidized bed, serves to heat the catalyst undergoing regeneration in bed B of vessel 1.

In operation, the feed stock to be hydroformed enters the present system through line 3, thence passes through a heat exchanger 4 where it passes in heat transfer relation ship with hot product to acquire a preheat, and thereafter the preheated feed is forced through a furnace F where it is heated to reaction temperature, and thereafter discharged into bed A. Simultaneously, "recycle" gas, that is, a gas containing a major portion of hydrogen obtained from the recovery system in a manner more fully explained hereinafter, is passed via line 5 through a pump 6, thence through heat exchanger 7, and thence through a furnace 8. The heated gas is withdrawn from the furnace 8 through line 9. A portion of the gas in line 9 is conducted via line 9a into the bottom of bed A. The remainder of the heated recycle gas passes into the lower ends of U-shaped tubes T, disposed as shown, in a fluidized bed C of inert powdered material. In operation, catalyst descends in one leg of each tube and ascends in the other along with the said heated recycle gas. Thus, circulation of catalyst from bed B through U-shaped tubes T wherein the catalyst is in indirect heat exchange relation to the hot fluidized bed of solids C and thence back into bed B. The heated catalyst returned to the bed B is treated with hydrogen and the contaminants previously formed on the catalyst in bed A are removed and its activity restored. Then by effective elutriation, the recycle gas carries the catalyst upwardly from bed B into bed A. In bed A, under conditions more fully set forth hereinafter, the naphthenic feed naphtha, or the like, undergoes hydroforming. The fluidized bed of catalyst in bed A is maintained in that state by causing the gases and vapors passing therethrough to flow at a superficial velocity of from 0.2 to 1.0 feet per second, thus forming a dense fluidized bed extending from G, which is a foraminous member, to an upper dense phase level L. Above L in bed A, there is a light phase constituting a dilute suspension of catalyst in gasiform material. Reaction products flow from bed A toward the exit, after first passing through one or more "cyclone" separators 10 wherein entrained fines are removed from the gasiform material and returned to bed A via one or more dip pipes d. The effluent vapors from the reactor pass via line 11 to a heat exchanger 12 (feed oil may be used to extract heat from the vapors and thus preheat feed to line 3), and thereafter into a scrubber S where catalyst still remaining in the gasiform material is removed by scrubbing with oil or heavy products in a known manner. A slurry containing the catalyst is withdrawn from scrubber S, through line 13, passed through a pump 14, and returned via line 15 to the upper portion of vessel 1. The vapors, substantially freed of entrained catalyst, are withdrawn from scrubber S, through line 16, thence passed through a cooler 17, thence passed via line 18 into a high pressure separator 19. From high pressure separator 19, hydrogen-rich gas (this is the "recycle" gas) containing 85–95% hydrogen, is withdrawn overhead through line 5 for recycling to bed A in vessel 1, as previously noted. A portion of this gas may be rejected from the system through line 21 so as to prevent buildup in the system of hydrogen, methane, etc., and also to permit escape of sulfur compounds which may be present in the original oil. The heavy material, which is the crude product, is withdrawn from separator 19, through line 20, thence passed through a reducing valve 21 into a stabilizer 22. From stabilizer 22, the desired product is withdrawn through line 23 and delivered to a storage drum 24. The heavy bottoms usually not amounting to more than 2% of the original feed are withdrawn through line 25. This material may be recycled in part to line 3 for re-running, or utilized in compounding other refinery products. From stabilizer 22, the light ends containing methane, ethane and propane, etc. are removed overhead through line 26 and disposed of or utilized in any conventional manner.

Referring again to vessel 1, it has been noted that the lower fluidized bed B contains catalyst undergoing regeneration, while the catalyst is in the form of a fluidized mass. The catalyst is withdrawn by gravity from bed A via tube 27, controlled by valve 28 and passed into bed B. The valve 28 in tube 27 is manipulated so the flow of catalyst from bed A to bed B is such that the average residence time of the catalyst in bed A is less than 2 hours, preferably, about ¾ of an hour. In bed B, the catalyst is maintained under conditions more fully set forth hereinafter, particularly, as to temperature. The residence time of catalyst in regeneration zone B should be such that it is from the same as, to three times that in bed A. It is obvious, of course, that the residence time given for catalyst in bed B above is merely illustrative and may be varied widely depending on the stock fed in the system and the severity of treatment. The residence time of the fouled catalyst in bed B should suffice to restore its activity and may vary both below and above the above set limits.

Referring again to bed C, which is also fluidized as indicated previously, a fluidizing gas consisting of hot vapors or fumes is charged into the bed from burner 27. To this burner 27, there is fed air through line 28 and a fuel gas through line 29. The resulting hot combustion fumes are withdrawn from the burner 27, through line 30 and charged into the bed C, as stated, increasing, of course, its temperature and heat content. The bed C itself, which is a fluidized solids heater, transfers heat to the gases and catalyst in tubes T (two shown, preferably a greater number of these tubes are disposed in bed C). Due to the fluidized nature of the particles in bed C which continuously scour and impinge upon the outer surfaces of tubes T, there is an excellent heat transfer between the bed C (which is at a temperature of about 1400° F.) and the gases and catalyst in said tubes T (which are at a temperature of about 600°–900° F.).

With respect to the tubes T, the catalyst flows downwardly from bed B in one leg and passes upwardly in the other leg, as explained, with the heated recycle gas to bed B because of the difference in density of the catalyst in the two legs due to the presence of gas fed in the legs through pipes 9C projecting into the upflow legs at a point above the lower ends thereof.

In vessels 1 and 2, reference characters L, $L_1$ and $L_2$ represent the upper dense phase levels of the fluidized beds of solids A, B and C, respectively, therein disposed; and the reference characters G and $G_1$ represent foraminous members supporting beds A and C, respectively.

Referring again to bed C, entrained inert powder and the fumes escaping from vessel 2 in line 31, are passed through a cyclone separator 32, or the like, to remove this entrained fines, and the removed fines are returned to bed C via line 33. The hot fumes issuing from separator 32 via line 34 are passed through any conventional heat recovery means 35, such as a waste heat boiler.

The system thus far described, wherein the catalyst is continuously regenerated in bed B of vessel 1 and returned to bed A in a reactivated state, may continue without interruption for an extended period of time. Due to upsets in the smooth operation of the process, it may become necessary to supplement the regeneration in bed B with auxiliary means to regenerate the catalyst. To this end, therefore, when the occasion requires, the catalyst is withdrawn from bed A through line 36 and passed to a hopper 37. To replace the catalyst withdrawn from line 36 and maintain the catalyst inventory in the system at a constant value, fresh catalyst from a hopper 38 is withdrawn through line 39 and thence passed into a mixing drum 40 where it is admixed with feed oil from line 41 to form a slurry. This slurry is then withdrawn from mixing drum 40, through line 42 and pumped by pump 43 via line 44 into the main oil feed line and thereafter into bed A.

The fouled catalyst in 37 in "aerated" form is withdrawn through line 45, passed through a cooler 46 and thence through a reducing valve 47 into a secondary regenerator 48, where it is maintained in the form of a dense fluidized bed similar to the beds A, B and C. The catalyst in regenerator 48 is treated with an oxygen-containing gas, which is introduced into the bottom of the regenerator 48 through line 49 along with inert gases from line 50. These gases in line 50 may be furnished from furnace 8 or any other point in the system. The air in line 49 is diluted by the flue gases in 50 to the extent that the oxygen content of the mixture is of the order of 2–6%, preferably, about 5%, and the atmosphere in regenerator 48 contains less than 1% oxygen. Although temperatures as high as 950° F. may be used, the temperature in regenerator 48 is preferably of the order of 800° F. and the residence time of the catalyst in the regenerator is, of course, sufficient to remove the contaminated deposits by burning them off. Ordinarily, this would be of the order of at least 2–4 hours, average residence time. As usual, the regenerator is provided with a foraminous support $G_2$ and the catalyst undergoing regeneration is formed in a bed having an upper dense phase level at $L_3$ above which there is the usual light phase. The regeneration fumes passing from the fluidized bed toward the exit line 52 are forced through filters 51 which serve the purpose of removing entrained fines. The operation in regeneration 48 is normally batch, because under ordinary circumstances, the regeneration effected in bed B is sufficient to maintain the catalyst at a sufficiently high activity level. If, however, it becomes necessary, means are hereby provided, as explained, for supplementing the hydrogen regeneration with an oxygen regeneration so the continuity of operation may be maintained in bed A.

The regenerated catalyst is withdrawn from regenerator 48, through line 53, cooled in cooler 54 and thereafter passed through 55 and delivered to mixer 40 for return to reactor 1 in slurry form, as previously indicated. Alternatively, the catalyst in line 53 may be passed via line 56 to a screening device 57 wherein fines may be separated from the coarser material and the latter then recovered from the screen operation through line 58. A good way to accomplish this separation of fines is by elutriation with a gasiform material, such as air. The catalyst in 58 is delivered to a treater 59 where it is connected with hydrogen fluoride introduced into the system through line 60 and passed via line 61 into the bottom of 59 and thereafter in contact with the catalyst to replace the hydrogen fluoride which may have been lost by volatilization in bed A. The hydrogen fluoride fumes are withdrawn from treater 59 through line 62 and recycled via blower 63 to line 61 for further use in the process. The revivified and retreated catalyst is recovered from 59 through line 64, thence passed into mixer 40 and returned to the reactor in a manner previously indicated.

Referring again to catalyst return line 44, it is desirable and/or necessary periodically or continuously to add hydrogen fluoride to the catalyst in the reactor by feeding it through line 44a to oil slurry in line 44, since this material may be lost from the catalyst by volatilization in the process. In the case where the auxiliary regeneration means comprising the oxygen regeneration are employed to maintain the catalyst at a high activity level, another means for adding hydrogen fluoride is provided by the treatment in vessel 59. Thus, there are disclosed two methods for ensuring a sufficient quantity of hydrogen fluoride to be present at all times in the catalyst in bed A of vessel 1.

As will hereinafter be more fully explained, the catalyst consists essentially of a carrier, the platinum group metal and an activator, such as HF. In the operation described, it may be necessary to add platinum during the operation as time goes on because of loss of activity due to crystallization of the platinum. Explaining this more fully, in order that the platinum be at its maximum activity, it should be in a colloidal or amorphous dispersed form. However, it can readily be understood that when the platinum is on heat for an extended period of time, it tends to become crystal in form and thus its activity level decreases. To counteract this tendency, additional catalyst in the form of platinic chloride is added to the reactor by introducing it through line 44b to the slurry of oil and catalyst in line 44 which feeds to reactor zone A.

It will be understood that the drawing is diagrammatic and that a petroleum engineer would understand that additional accessory apparatus should be included over and beyond that shown or indicated, in order that the hydroforming plant may operate at maximum efficiency. Such accessory apparatus would include devices, such as flow meters, level indicators, sight glasses, temperature recorders, pressure recorders, etc.

In order to more fully explain the present invention, there is set forth below typical operating conditions, first in vessel 1 as to beds A and B, then in vessel 2 as to bed C.

|  | Range | Preferred |
| --- | --- | --- |
| Conditions in Bed A: |  |  |
| Pressure, p. s. i. g | 150–500 | 200 |
| Temperature, °F | 850–950 | 900 |
| Space Velocity, lbs. oil/hr./lb. catalyst | 1.5–4.0 | 2.0 |
| Velocity at conditions, ft./sec | 0.3–1.2 | 0.7 |
| Recycle gas, S. C. F./Bbl. feed | 3,000–7,000 | 5,000 |
| Carbon on Catalyst, wt. percent | 0.5–3.0 | 1.1 |
| Conditions in Bed B: |  |  |
| Pressure, p. s. i. g | 150–500 | 200 |
| Temperature, °F | 900–1100 | 1,000 |
| Catalyst, lbs./lb. in bed A | 0.5–3.0 | 1.5 |
| Catalyst circulation, bed A to bed B as lbs./lb. feed | 0.5–5.0 | 2.0 |
| Velocity at conditions, ft./sec | 0.3–1.2 | 0.6 |
| Recycle gas, S. C. F./Bbl. feed | 3,000–7,000 | 5,000 |
| Carbon on catalyst, wt. percent | 0.2–1.0 | 0.6 |
| Conditions in Bed C: |  |  |
| Pressure, p. s. i. g | 10–40 | 15 |
| Temperature, °F | 1,200–1,500 | 1,300 |
| Velocity at conditions, ft./sec | 1.0–5.0 | 2.0 |
| Depth—5–10 ft. outage on top of bed. |  |  |

In order further to describe the present invention, the following illustrative example is set forth indicating the results attainable by observing the above preferred operating conditions:

*Inspection of feed*

| | |
|---|---|
| Gravity—°API | 55.2 |
| Octane number, CFRR | 51.3 |
| Aniline point, °F | 124 |
| Sulphur, wt. percent | 0.05 |

Distillation:

| | °F |
|---|---|
| IBP | 228 |
| 10% | 241 |
| 30 | 249 |
| 50 | 259 |
| 70 | 274 |
| 90 | 297 |
| FBP | 322 |

| | Percent |
|---|---|
| Aromatics | 8.5 |
| Naphthenes | 44.0 |
| Paraffins | 47.5 |

*Yields and inspection of product*

| | | |
|---|---|---|
| $C_5$ to E. P. gasoline | vol. percent | 83.6 |
| $C_4$ to E. P. gasoline | do | 92.5 |
| $H_2$ | | 1.1 |
| $CH_4$ | | 0.7 |
| $C_3H_6$ | | 0.7 |
| $C_3H_8$ | | 3.2 |

$C_4$ to E. P. Gasoline:

| | |
|---|---|
| Clear octane number, CFRR | 96.2 |
| RVP | 9.7 |
| Gravity, °API | 52.3 |

Distillation:
Percent at

| | |
|---|---|
| 212° F | 26.5 |
| 257 | 50.0 |
| 302 | 83.0 |
| Loss | 2.0 |

It is to be clearly understood that while the description of a so-called hydroforming process has been described in detail, the present improvements are applicable to the isomerization of normal paraffins, isomerization of cyclic paraffins, such as methyl cyclopentane to benzene, hydropolymerization of low boiling hydrocarbons and selective hydrogenation of unsaturated and impure hydrocarbons. The operating conditions, of course, are particular to these separate operations involved, the temperature being in the order of 600°–800° F. in the operations where the molecular weight of the feed is not substantially altered. In the case where the molecular weight is changed due to hydrocracking or hydropolymerization, temperatures in the order of 900°–950° F. are used. In the latter case, pressures in the order of 200–500 p. s. i. g. are desirable.

An important modification of the invention involves omitting the two furnaces F shown in the drawing and supplying all of the heat required in the combustion zone containing the bed of solids C. Also, the use of the combustion zone containing the bed of solids C may be omitted where the operation is performed under the milder of the conditions of temperature and pressure shown above, and heat is then supplied as required by either or both of the furnaces F.

Numerous modifications of the present invention will be apparent to those who are familiar with this art without departing from the spirit thereof.

What is claimed is:

1. A continuous method for hydroforming hydrocarbon oils boiling in the naphtha boiling range which comprises providing a fluidized bed of a platinum-containing catalyst in a hydroforming reaction zone, feeding a hydrogen-containing gas to said fluidized bed, feeding preheated naphtha vapors into said fluidized bed at a point above the bottom thereof, maintaining hydroforming conditions of temperatures between 850° F. and 950° F. and pressures of between 150 and 500 lbs. per sq. inch conducive to the formation of a naphtha product having an octane number above 90 while simultaneously causing the accumulation of inactivating coke deposits upon the catalyst particles, continuously withdrawing catalyst from said hydroforming reaction zone into a primary regeneration zone, maintaining the catalyst in the primary regeneration zone in the form of a fluidized bed, continuously withdrawing a plurality of streams of catalyst from the fluidized bed in the primary regeneration zone and heating the catalyst in said streams by passing them through a combustion zone wherein the catalyst is heated by indirect heat exchange with a separate bed of hot fluidized solids, contacting the catalyst undergoing regeneration with hydrogen-containing gas for a sufficient period of time to remove contaminating deposits from the catalyst and to restore its activity, thereafter returning said hydrogen treated catalyst in suspension in said hydrogen-containing gas into said hydroforming reaction zone and removing high octane hydroformate overhead from said hydroforming reaction zone.

2. The method set forth in claim 1 in which the catalyst undergoing hydrogen regeneration treatment is heated by burning a fuel gas in contact with the bed of fluidized solids in said combustion zone.

3. The method as defined in claim 2 in which hydrogen-containing gas is supplied to said plurality of streams of catalyst to convey the said streams of catalyst back into the fluidized bed in said primary regeneration zone.

4. The method as defined in claim 1 in which a separate stream of catalyst is withdrawn from the fluidized bed in the hydroforming reaction zone and conducted to a secondary regeneration zone, treating the catalyst in said secondary regeneration zone with an oxygen-containing gas to burn carbonaceous deposits therefrom, and returning the oxygen-regenerated catalyst to said hydroforming reaction zone.

5. The method as defined in claim 4 in which the catalyst regenerated in the secondary regeneration zone by means of an oxygen-containing gas is treated to remove fines, thereafter treated with hydrogen fluoride, slurried with naphtha feed, and returned to the hydroforming reaction zone.

References Cited in the file of this patent
UNITED STATES PATENTS

| | | |
|---|---|---|
| 2,325,516 | Holt et al. | July 27, 1943 |
| 2,363,874 | Krebs | Nov. 28, 1944 |
| 2,436,618 | Sweeney | Feb. 24, 1948 |
| 2,472,844 | Munday et al. | June 14, 1949 |
| 2,479,110 | Haensel | Aug. 16, 1949 |
| 2,525,812 | Lien et al. | Oct. 17, 1950 |